US012681751B2

(12) United States Patent　　　　(10) Patent No.:　US 12,681,751 B2
Tang et al.　　　　　　　　　　　　(45) Date of Patent:　　　Jul. 14, 2026

(54) METHOD AND APPARATUS FOR STARTING SECURE CONTAINER

(71) Applicant: Cloud Intelligence Assets Holding (Singapore) Private Limited, Singapore (SG)

(72) Inventors: Huamin Tang, Hangzhou (CN); Yupeng Chen, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 318 days.

(21) Appl. No.: 18/478,910

(22) Filed: Sep. 29, 2023

(65) Prior Publication Data

US 2024/0028382 A1　　Jan. 25, 2024

Related U.S. Application Data

(63) Continuation of application No. PCT/CN2022/077745, filed on Feb. 24, 2022.

(51) Int. Cl.
　　*G06F 9/455*　　　　(2018.01)
(52) U.S. Cl.
　　CPC ................... *G06F 9/45558* (2013.01); *G06F 2009/45562* (2013.01); *G06F 2009/45575* (2013.01); *G06F 2009/45587* (2013.01); *G06F 2009/45591* (2013.01)
(58) Field of Classification Search
　　CPC ....... G06F 9/45558; G06F 2009/45562; G06F 2009/45575
　　See application file for complete search history.

(56) References Cited

U.S. PATENT DOCUMENTS

| | | | |
|---|---|---|---|
| 9,679,007 B1 * | 6/2017 | Feldman | ............. G06F 16/2365 |
| 10,061,520 B1 | 8/2018 | Zhao et al. | |
| 11,573,814 B1 * | 2/2023 | Aithal | ................... G06F 16/188 |
| 2014/0053150 A1 | 2/2014 | Barnett et al. | |
| 2019/0392052 A1 * | 12/2019 | Chen | ..................... G06F 16/178 |

(Continued)

FOREIGN PATENT DOCUMENTS

| | | |
|---|---|---|
| CN | 110308972 A | 10/2019 |
| CN | 107341073 A | 7/2020 |
| CN | 113296887 A | 8/2021 |

OTHER PUBLICATIONS

International Search Report mailed May 7, 2022, from PCT/CN2022/077745 filed Feb. 24, 2022, 2 pages.

(Continued)

*Primary Examiner* — Edward J Dudek, Jr.
(74) *Attorney, Agent, or Firm* — Osha Bergman Watanabe & Burton LLP

(57) ABSTRACT

A method and an apparatus for starting a secure container are provided. The method includes: adding a container image into a secure container in a read-only manner when starting a first container corresponding to the container image in the secure container; aggregating a read-write layer of the first container with the container image in the secure container to obtain a file system of the first container; and aggregating a read-write layer of a second container with the container image when starting the second container corresponding to the added container image in the secure container to obtain a file system of the second container.

12 Claims, 6 Drawing Sheets

(56)          References Cited

U.S. PATENT DOCUMENTS

| | | | |
|---|---|---|---|
| 2020/0104385 A1* | 4/2020 | Zheng | G06F 9/45558 |
| 2020/0110830 A1* | 4/2020 | Chen | G06F 16/27 |
| 2020/0250319 A1* | 8/2020 | Bacher | G06F 16/116 |
| 2022/0222223 A1* | 7/2022 | Wu | G06F 9/45558 |
| 2024/0403092 A1* | 12/2024 | Berrangé | G06F 9/45558 |

OTHER PUBLICATIONS

Written Opinion mailed May 7, 2022, from PCT/CN2022/077745 filed Feb. 24, 2022, 4 pages.
Search Report for European Application No. 22778415.4, Dated Dec. 19, 2024, 10 pages.

\* cited by examiner

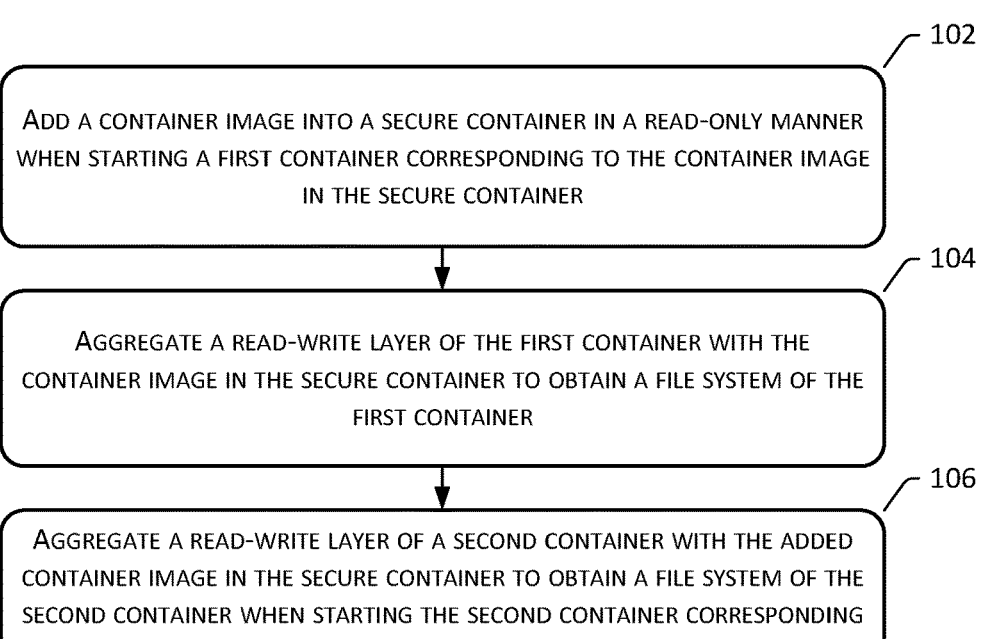

100

102

ADD A CONTAINER IMAGE INTO A SECURE CONTAINER IN A READ-ONLY MANNER WHEN STARTING A FIRST CONTAINER CORRESPONDING TO THE CONTAINER IMAGE IN THE SECURE CONTAINER

104

AGGREGATE A READ-WRITE LAYER OF THE FIRST CONTAINER WITH THE CONTAINER IMAGE IN THE SECURE CONTAINER TO OBTAIN A FILE SYSTEM OF THE FIRST CONTAINER

106

AGGREGATE A READ-WRITE LAYER OF A SECOND CONTAINER WITH THE ADDED CONTAINER IMAGE IN THE SECURE CONTAINER TO OBTAIN A FILE SYSTEM OF THE SECOND CONTAINER WHEN STARTING THE SECOND CONTAINER CORRESPONDING TO THE CONTAINER IMAGE IN THE SECURE CONTAINER

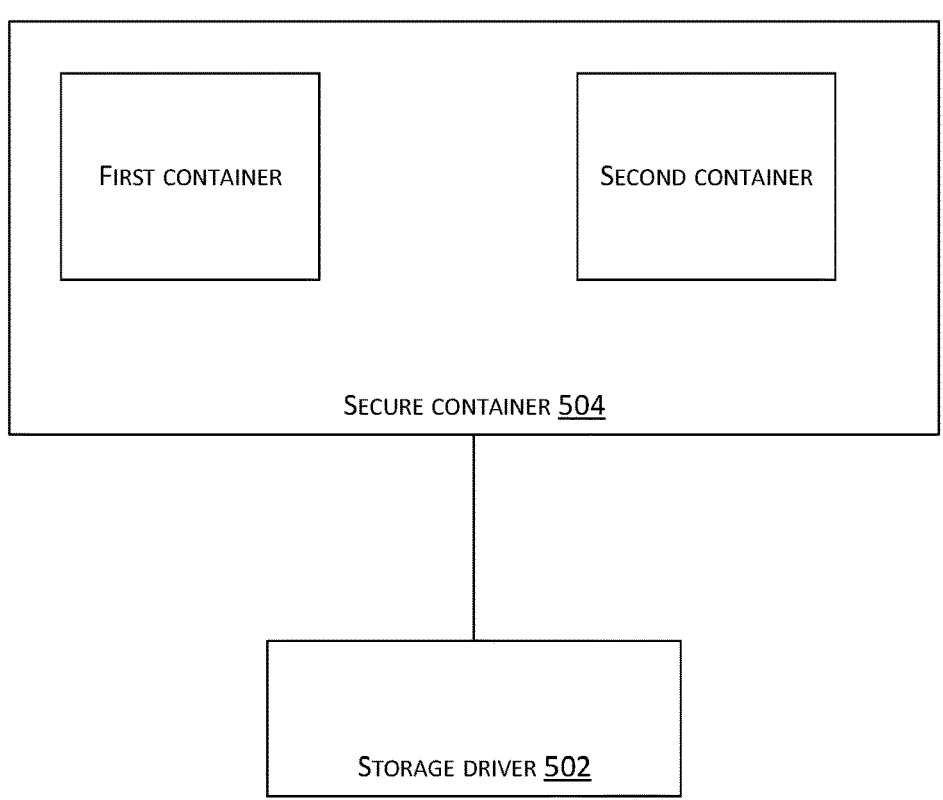
FIG. 5

METHOD AND APPARATUS FOR STARTING SECURE CONTAINER

CROSS REFERENCE TO RELATED PATENT APPLICATIONS

This application claims priority to and is a continuation of PCT Patent Application No. PCT/CN2022/077745 filed on 24 Feb. 2022, and is related to and claims priority to Chinese Application No. 202110352819.4, filed on 31 Mar. 2021 and entitled "Method and Apparatus for Starting Secure Container," which are incorporated herein by reference in their entirety.

TECHNICAL FIELD

The present disclosure relates to the field of computer technologies, and in particular, to methods for starting a secure container. The present disclosure also relates to apparatuses for starting a secure container, computing devices, and computer-readable storage media.

BACKGROUND

A secure container is a container that supports kernel isolation technology, and has its own kernel as compared to ordinary containers. Since a traditional container runs on a host and still shares kernels with other processes on the host, a secure container has an independent kernel, thus having better security and better isolation.

However, while bringing better security, secure containers inevitably introduce some performance loss. When a security container starts a large number of containers, CPU and memory overhead are high, and the speed of starting a container is slow.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, embodiments of the present disclosure provide a method for starting a secure container. One or more embodiments of the present disclosure also relate to an apparatus for starting a secure container, a computing device, and a computer-readable storage medium, so as to solve technical defects existing in existing technologies.

According to the embodiments of the present disclosure, a method for starting a secure container is provided, and includes: adding a container image into a secure container in a read-only manner when starting a first container corresponding to the container image in the secure container; aggregating a read-write layer of the first container with the container image in the secure container to obtain a file system of the first container; and aggregating a read-write layer of a second container with the container image when starting the second container corresponding to the added container image in the secure container to obtain a file system of the second container.

In implementations, the method further includes: when starting a container, in a virtual machine kernel of the secure container, creating a read-write layer directory from a directory of the storage medium according to a unique identifier of the container and assigning thereof to the container.

In implementations, adding the container image to the secure container in the read-only manner when starting the first container corresponding to the container image in the secure container, includes: detecting a transfer of the container image to the secure container; determining whether the container image has been added into the secure container when the transfer of the container image to the secure container is detected; and if not, adding the container image to the secure container in the read-only manner.

In implementations, aggregating the read-write layer of the second container with the added container image in the secure container when starting the second container corresponding to the container image in the secure container to obtain the file system of the second container, includes: detecting a transfer of the container image to the secure container; determining whether the container image has been added into the secure container when the transfer of the container image to the secure container is detected; if so, aggregating the read-write layer of the second container with the added container image in the secure container to obtain the file system of the second container.

In implementations, determining whether the container image has been added into the secure container includes: determining whether a current reference count corresponding to the container image is an initial value; if being an initial value, determining that the container image has not been added into the secure container; and if being not the initial value, determining that the container image has been added to the secure container, wherein the current reference count corresponding to the container image is updated accordingly when the container image is used by any container and when a task of the any container that uses the container image is finished.

In implementations, adding the container image into the secure container in the read-only manner includes: adding a block device of the container image into the secure container in the read-only manner through a storage driver of a block device on a host machine, the block device storing the container image, wherein the storage driver of the block device on the host machine stores the container image in a form of block device according to a block device type defined in a configuration file of the secure container.

In implementations, adding the block device of the container image into the secure container in the read-only manner through the storage driver of the block device on the host machine includes: receiving a block device delivered by the storage driver on the host machine; mounting the block device on an image directory in the secure container, and recording a path of an image directory of the block device; aggregating the read-write layer of the second container with the added container image in the secure container includes: aggregating a path of the read-write layer of the second container with the path of the image directory of the block device in the secure container to obtain a path of the file system of the second container.

In implementations, the method further includes: determining whether to delete the container image from the secure container according to a preset deletion policy after tasks of all containers corresponding to the container image are finished.

According to the embodiments of the present disclosure, an apparatus for starting a secure container is provided, and includes: an adding module configured to add a container image into a secure container in a read-only manner when starting a first container corresponding to the container image in the secure container; a first merge module configured to aggregate a read-write layer of the first container with the container image in the secure container to obtain a file system of the first container; and a second merge module configured to aggregate a read-write layer of a second container with the container image when starting the second container corresponding to the added container image in the secure container to obtain a file system of the second container.

According to the embodiments of the present disclosure, a computing device is provided, and includes: a memory and a processor, the memory being used to store computer-executable instructions, and the processor being used to execute the computer-executable instructions: adding a container image into a secure container in a read-only manner when starting a first container corresponding to the container image in the secure container; aggregating a read-write layer of the first container with the container image in the secure container to obtain a file system of the first container; and aggregating a read-write layer of a second container with the container image when starting the second container corresponding to the added container image in the secure container to obtain a file system of the second container.

According to the embodiments of the present disclosure, a computer-readable storage medium is provided, which stores computer instructions, and when the computer instructions, when executed by a processor, implement the steps of the method for starting a secure container described in any embodiment of the present disclosure.

The present disclosure provides a method for starting a secure container. Since the method adds a container image into a secure container in a read-only manner when starting a first container corresponding to the container image in the secure container, aggregates a read-write layer of the first container with the container image in the secure container to obtain a file system of the first container, and aggregates a read-write layer of a second container with the added container image in the secure container when starting the second container corresponding to the container image in the secure container to obtain a file system of the second container, this method therefore reuses resources by sharing read-only images and creating read-write layers of containers inside a secure container, thus avoiding additional processes to assist process 10 forwarding, saving memory consumption, and being more stable, and thereby realizing a quick start of a large number of containers in seconds.

BRIEF DESCRIPTION OF THE DRAWINGS

FIG. 1 is a flowchart of a method for starting a secure container provided by the embodiments of the present disclosure.

FIG. 5 is a schematic structural diagram of a system for starting a secure container provided by the embodiments of the present disclosure.

DETAILED DESCRIPTION

Figure 2:
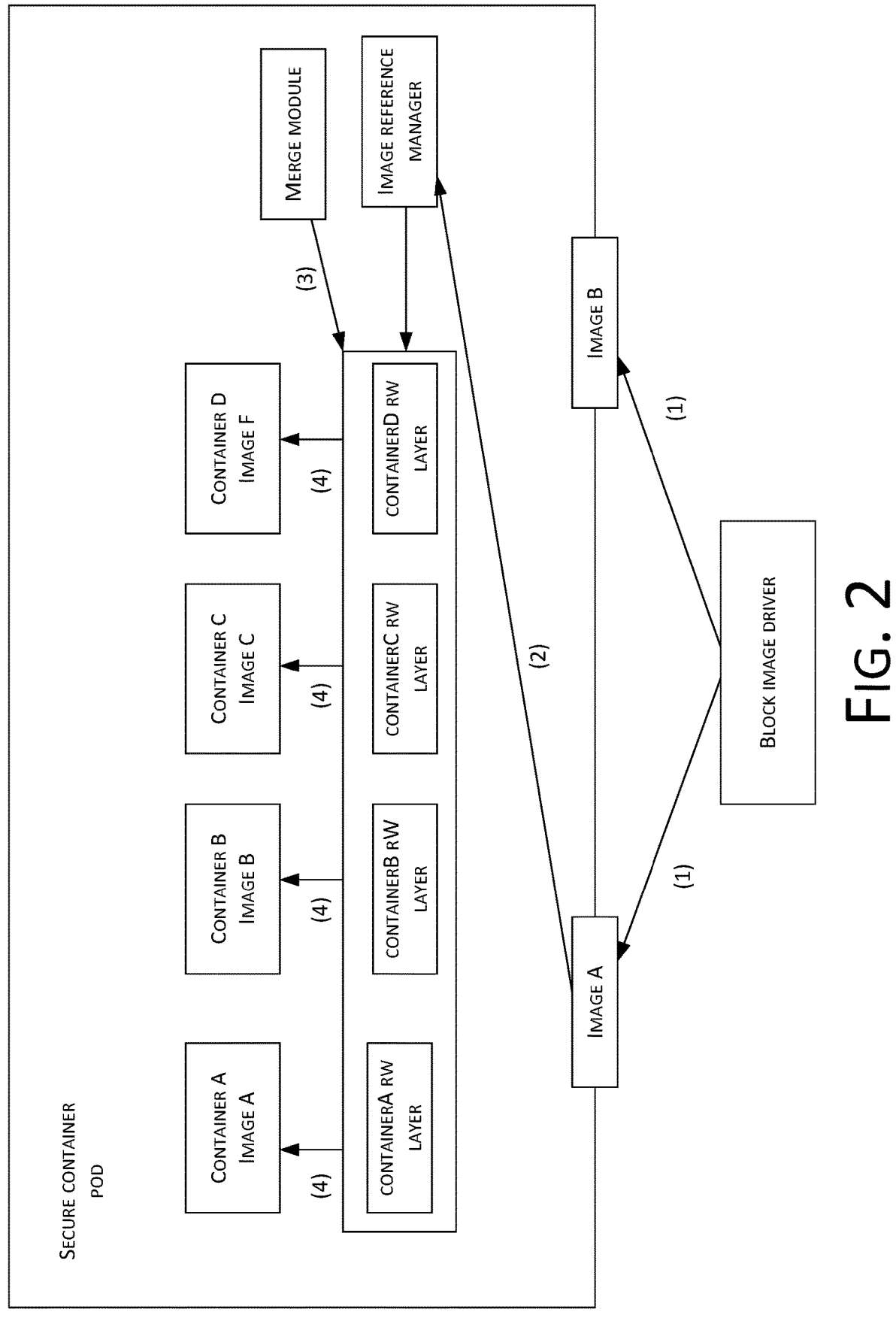
FIG. 2 is a schematic framework diagram of a method for starting a secure container provided by the embodiments of the present disclosure.

In the following description, a number of specific details are set forth in order to provide a thorough understanding of the specification. However, the present disclosure can be implemented in many other ways different from those described herein. One skilled in the art can make similar extensions without violating the connotation of the present disclosure. Therefore, the present disclosure is not limited by specific implementations disclosed below.

Terms used in one or more embodiments of the present disclosure are intended for describing specific embodiments only, and are not intended to limit one or more embodiments of the present disclosure. As used in one or more embodiments of the present disclosure and the appended claims, singular forms "a", "said", and "the" are also intended to include plural forms unless the context clearly dictates otherwise. It should also be understood that the term "and/or" used in one or more embodiments of the present disclosure refers to and includes any or all possible combinations of one or more associated items that are listed.

It should be understood that, although terms "first", "second", etc. may be used to describe various types of information in one or more embodiments of the present disclosure, these pieces of information should not be limited to these terms. These terms are only used to distinguish information of the same type from each other. For example, the first may also be referred to as the second, and similarly, the second may also be referred to as the first without departing from the scope of one or more embodiments of the present disclosure. Depending on the context, the word "if" as used herein may be interpreted as "at the time when" or "when" or "in response to determining that".

First, nouns and terms involved in one or more embodiments of the present disclosure are explained.

Block device: A random access device having a certain structure, which is read and written in blocks.

Container image: A special file system that provides files such as programs, libraries, resources, configuration, etc., that are required when running a container.

In the present disclosure, a method for starting a secure container is provided. The present disclosure also relates to an apparatus for starting a secure container startup, a computing device, and a computer-readable storage medium, which are described in detail in the following embodiments.

FIG. 1 shows a flowchart of a method 100 for starting a secure container according to the embodiments of the present disclosure, which includes steps 102 to 106.

Step 102: Add a container image into a secure container in a read-only manner when starting a first container corresponding to the container image in the secure container.

A relationship between a container image and a container can be bound one by one. For example, each container can have a corresponding running file, which includes which container image needs to be used when the container starts.

Step 104: Aggregate a read-write layer of the first container with the container image in the secure container to obtain a file system of the first container.

It can be understood that, in the embodiments of the present disclosure, a read-write layer of a container is created in a storage medium of a secure container, and is aggregated with an container image in the secure container. For example, when a container image is added into a secure container, the container image is mounted on an image directory of the secure container by means of a file system or a block device, and a path of an image directory of the container image is recorded. During aggregation, a path of a read-write layer of a first container is merged with the path of the image directory of the container image to obtain a path of a file system of the first container.

Step 106: Aggregate a read-write layer of a second container with the added container image in the secure container to obtain a file system of the second container when starting the second container corresponding to the container image in the secure container.

For example, during aggregation, a path of a read-write layer of a second container is combined with the path of the image directory of the container image to obtain a path of a file system of the second container.

Since the method adds a container image into a secure container in a read-only manner when starting a first container corresponding to the container image in the secure container, aggregates a read-write layer of the first container with the container image in the secure container to obtain a file system of the first container, and aggregates a read-write layer of a second container with the added container image in the secure container when starting the second container corresponding to the container image in the secure container to obtain a file system of the second container, this method therefore reuses resources by sharing read-only images and creating read-write layers of containers inside a secure container, thus avoiding additional processes to assist process 10 forwarding, saving memory consumption, and being more stable, and thereby realizing a quick start of a large number of containers in seconds.

The method provided by the embodiments of the present disclosure does not limit the timing of creating a read-write layer of a container. For example, when starting a container, in a virtual machine kernel of a secure container, a directory of a read-write layer may be created from a directory of a storage medium according to a unique identifier of the container and assigned to the container. For another example, a read-write layer may also be allocated in advance.

It should be noted that the methods provided in the embodiments of the present disclosure are not limited to specific implementations of sharing of container images. For example, the same container image can be added to a secure container once or multiple times. There is no limit to the number of containers sharing the same container image, which can be shared by two or more than two containers. Considering maximally reusing resources, it is possible to detect a transfer of a container image to a secure container. For the same container image, only the first transfer detected is added, and subsequent transfers detected can be shared. For example, when a container image is transferred to a secure container, a file may actually be transferred, and the file includes a path of the container image. Therefore, the transfer of the file can be detected. When the transfer is detected, the container image is added to the secure container if the container image has not been added to the secure container. If the container image has been added to the secure container, it is not necessary to add the container image again, but to share the added container image, thus achieving the purpose of reusing resources to the greatest extent.

Specifically, adding the container image to the secure container in the read-only manner when starting the first container corresponding to the container image in the secure container, includes: detecting a transfer of the container image to the secure container; determining whether the container image has been added to the secure container when the transfer of the container image to the secure container is detected; and if not, adding the container image to the secure container in the read-only manner. For another example, aggregating the read-write layer of the second container with the added container image in the secure container when starting the second container corresponding to the container image in the secure container to obtain the file system of the second container, includes: detecting a transfer of the container image to the secure container; determining whether the container image has been added to the secure container when detecting the transfer of the container image to the secure container; and if so, aggregating the read-write layer of the second container with the added container image in the secure container to obtain the file system of the second container.

In order to facilitate determining whether the container image has been added to the secure container, in one or more embodiments of the present disclosure, such determination is made based on a current number of references to the container image. Specifically, for example, determining whether the container image has been added to the secure container includes: determining whether a current number of references corresponding to the container image is an initial value; if being the initial value, determining that the container image has not been added to the secure container; and if not being the initial value, determining that the container image has been added to the secure container, wherein the current number of references corresponding to the container image is updated accordingly when the container image is used by any container or when a task of any container using the container image is finished.

For example, the initial value of the current number of references corresponding to the container image may be "0". Whenever a container image is used by any container, its corresponding current number of references, which acts as a memory count, is increased by one, and whenever a task of any container using the container image ends, its corresponding current number of references is decreased by one.

It should be noted that the embodiments of the present disclosure do not limit storage methods of container images. For example, a container image can be stored in a form of a file system or block device. For example, a file system mode includes overlay/aufs and other modes. For another example, block devices can have devmapper and other methods. Since storing a container image in a form of a block device has a higher 10 performance for a secure container, in one or more embodiments of the present disclosure, adding the container image to the secure container in the read-only manner may include: adding a block device of the container image to the secure container in the read-only manner through a storage driver of a block device on a host machine, the container image being stored in the block device. The storage driver of the block device on the host machine stores the container image in a form of a block device according to a block device type defined in a configuration file of the secure container. For example, block device types may include: qcow2/raw/local disk, etc.

In one or more embodiments of the present disclosure, adding the block device of the container image to the secure container in the read-only manner through the storage driver of the block device on the host machine includes: receiving the block device information from the storage driver on the host machine; and mounting the block device on an image directory in the secure container, and recording a path of an image directory of the block device. Aggregating the read-write layer of the second container with the added container image in the secure container includes: aggregating a path of the read-write layer of the second container in the secure container with the path of the image directory of the block device to obtain the path of the file system of the second container.

It is understandable that data of a container image is stored in a block device. When the block device is added to a secure container, the secure container will specify a directory to mount the block device storing the image data to this directory. When starting the container, a path of the image directory of the block device is aggregated with a path of a read-write layer to generate a path of a file system of the container. As can be seen, in this embodiment, after the container is started, the high-performance I/O of the block device will improve the performance of task execution of the container when the container executes a task. Moreover, compared with the existing technologies where each container stores its own block device, this embodiment only needs to store one shared block device in the secure container for multiple containers that share the same container image, reducing the consumption of disk storage. For the host, only one block device needs to be generated for multiple containers sharing a container image, instead of generating multiple block devices in one-to-one correspondence with the containers, which also reduces the consumption of storage resources and computing resources of the host.

In order to reduce memory consumption, one or more embodiments of the present disclosure further include: determining whether to delete the container image according to a preset deletion policy when tasks of all containers corresponding to the container image end. For example, when the current reference count corresponding to the container image returns from being greater than the initial value to the initial value, a determination can be made that the tasks of all the corresponding containers end.

For example, the current reference count of the container image can be recorded, that is, the number of times the image is referenced by containers. When the reference is cleared, the current image is considered to be useless. A selection can be made as to whether to delete the image when the last container that references the image exits according to configuration. For example, in some scenarios, a large number of identical short-term tasks, such as some data calculation tasks, may be run, and they may use the same image. In this case, when the current reference count of the image drops to zero, the same tasks may be rerun at a subsequent time. Therefore, in this application scenario, a preset deletion policy can be configured not to delete the image when the current reference count reduces to zero in order to speed up the task startup. In implementations, for another example, the duration for which the current reference count is cleared can be timed, and the image can be deleted when determining that it has not been used for a long time. For another example, in some scenarios, it is generally not often to run a large number of the same short-term tasks, that is, after the tasks of the containers end, the same tasks may not be run immediately. Therefore, a preset deletion policy can be configured as deleting the image when the current reference count reduces to zero to reduce memory consumption.

It needs to be noted that when the methods provided in the embodiments of the present disclosure are applied in an actual scenario, a corresponding interactive interface may be provided according to the requirements of the implementation scenario. For example, an option for a user to select an accelerated startup of a secure container may be provided in the interactive interface, and the methods provided in the embodiments of the specification may be applied to accelerate the startup of the secure container according to the user's selection. For another example, a user may be provided with an input method of configuration information for setting a deletion policy in the interactive interface, which may be various types of input methods such as text or voice. For example, configuration information of deletion polic (ies) of the user can be received through the interactive interface to determine whether a task performed by a secure container is a short-term task, whether an image needs to be deleted when the last container that references the image exits, or an allowable time length of the duration that the reference count is zero, etc.

In the following, in conjunction with FIG. 2, using the method for starting a secure container provided in the present disclosure to quickly start a container in a pod (the smallest scheduling unit in the kubernetes system) of a secure container is used as an example, to further explain the method for starting a secure container. FIG. 2 shows a schematic diagram of a specific framework of a method for starting a secure container provided by an embodiment of the present disclosure.

A block image driver as shown in FIG. 2 is an image driver of a block device and a module in a container engine, which is used to convert a container image into a corresponding block device format. The block image driver can run on a host machine, providing a block device storage method for container images, and being responsible for transferring the container images to a secure container. Data of a container image is stored in the host machine by the block image driver (which can be, for example, any form of a storage driver, regardless of whether the driver has the ability to support snapshots) in a form of a block device and is transmitted to a container in a read-only manner.

An image reference manager as shown in FIG. 2 can be used to record the current reference count of a container image. When the reference is cleared, the corresponding container image is considered to be useless. A selection can be made as to whether to delete the container image when the last container referencing the container image exits.

A merge (aggregation) module as shown in FIG. 2 can be used to select a storage medium in a guest kernel (virtual machine kernel) for a secure container to assign a read-write layer after the container receives a container image, and to provide a filesystem for the container after combining the container image with the read-write layer.

According to the above framework diagram, as shown in FIG. 2, a process of starting a container may include:

(1) The block image driver (the storage driver of the block device) transfers a file including a path of a container image to a secure container.

(2) The security container detects the transfer of the file, and an image reference manager updates the current reference count of the corresponding container image to determine whether it is the first reference, adds the container image to the security container as a block device if affirmative, and does not add it again if not.

(3) When the container image is referenced for the first time, the merge module mounts a block device of the corresponding container image into a directory, records a path of the directory of the image, creates a read-write layer of a container in the storage medium, and then executes an actual aggregation operation. When the container image is not referenced for the first time, the merge module indexes to the path of the corresponding image directory, creates a read-write layer of a container in the storage medium, and then performs an actual aggregation operation.

(4) After the merge module provides a file system of the container, the startup of the container is completed.

In the following, processing steps of the methods provided by the embodiments of the present disclosure are schematically described by using the startup of a container corresponding to an image A as an example. For example, a starting process of a container corresponding to an image A may include: transferring, by a block image driver, a including a path of the image A to a secure container. An image reference manager updates a current reference count of the image A. When the image A is referenced for the first time, such as when a "container A" as shown in FIG. 2 is started, a block device of the image A is added to a secure container, and the merge module can mount the block device of the image A as a directory and record a path of the directory of the image A. When the image A is not referenced for the first time, such as when a "container B" as shown in FIG. 2 is started, the merge module can directly obtain the path of the directory of the image A. For the container A, the merge module creates a read-write layer of the container A, such as a "containerA rw layer" as shown in FIG. 2, in a storage medium, and performs an aggregation operation of the path of the "containerA rw layer" and the path of the "image A". For the container B, the merge module creates a read-write layer of the container B, such as a "containerB rw layer" as shown in FIG. 2, in the storage medium, and performs an aggregation operation of the path of the "containerB rw layer" and the path of the "image A".

Processing of image B as shown in FIG. 2 is similar to that of image A, and will not be repeated herein.

According to the above processing process, it can be seen that different container images represent different tasks to run. After starting a pod of a secure container, a large number of high-performance containers can be quickly started inside the pod to run set tasks. When the pod starts a first container of a container image, no corresponding image layer exists inside the secure container, and the container image is passed into the container through an interface provided by the secure container. After the first container is started, since there is already a corresponding container image in the secure container when subsequent containers are started, and the current reference count of the container image is maintained inside the secure container to represent the container's reference to the image, the process of mounting the container image by the subsequent containers can be skipped when starting the containers corresponding to the container image, thus achieving the purpose of fast startup. For example, hundreds of containers can be started in seconds, which is very friendly to short-task applications.

It can be understood that the methods provided by the embodiments of the present disclosure can be applied to any scenario that needs to start multiple containers concurrently and quickly, such as scenarios of big data computing under systems such as kubernetes and meson, etc. For example, in a scenario where the methods provided by the embodiments of the present disclosure is applied to quickly start a container in a pod, a scheduling system of a kubernetes system can be used to create the container.

Figure 3:
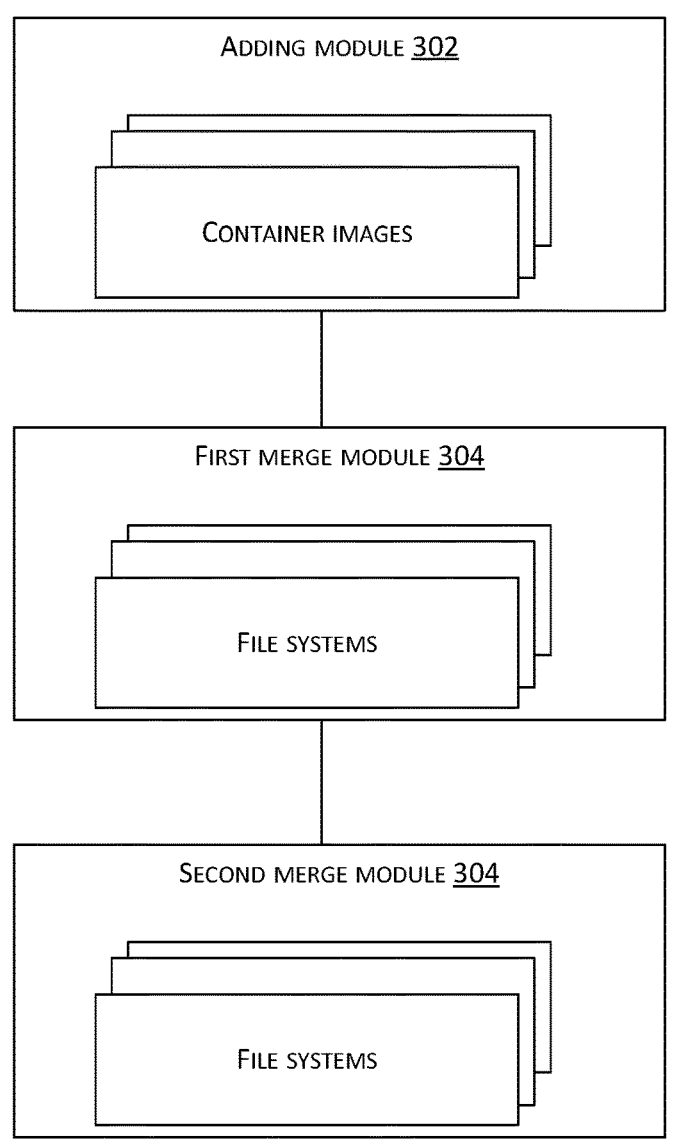
FIG. 3 is a schematic structural diagram of an apparatus for starting a secure container provided by the embodiments of the present disclosure.

Corresponding to the foregoing method embodiments, the present disclosure also provides an exemplary apparatus for starting a secure container. FIG. 3 shows a schematic structural diagram of an apparatus 300 for starting a secure container provided by the embodiments of the present disclosure. As shown in FIG. 3, the apparatus 300 includes: an adding module 302, a first merge module 304, and a second merge module 306.

The adding module 302 may be configured to add a container image to a secure container in a read-only manner when starting a first container corresponding to the container image in the secure container.

The first merge module 304 may be configured to aggregate a read-write layer of the first container with the container image in the secure container to obtain a file system of the first container.

The second merge module 306 may be configured to aggregate a read-write layer of the second container with the added container image in the secure container when starting the second container corresponding to the container image in the secure container to obtain a file system of the second container.

Since the apparatus adds a container image into a secure container in a read-only manner when starting a first container corresponding to the container image in the secure container, aggregates a read-write layer of the first container with the container image in the secure container to obtain a file system of the first container, and aggregates a read-write layer of a second container with the added container image in the secure container when starting the second container corresponding to the container image in the secure container to obtain a file system of the second container, this apparatus therefore reuses resources by sharing read-only images and creating read-write layers of containers inside a secure container, thus avoiding additional processes to assist process 10 forwarding, saving memory consumption, and being more stable, and thereby realizing a quick start of a large number of containers in seconds.

Figure 4:
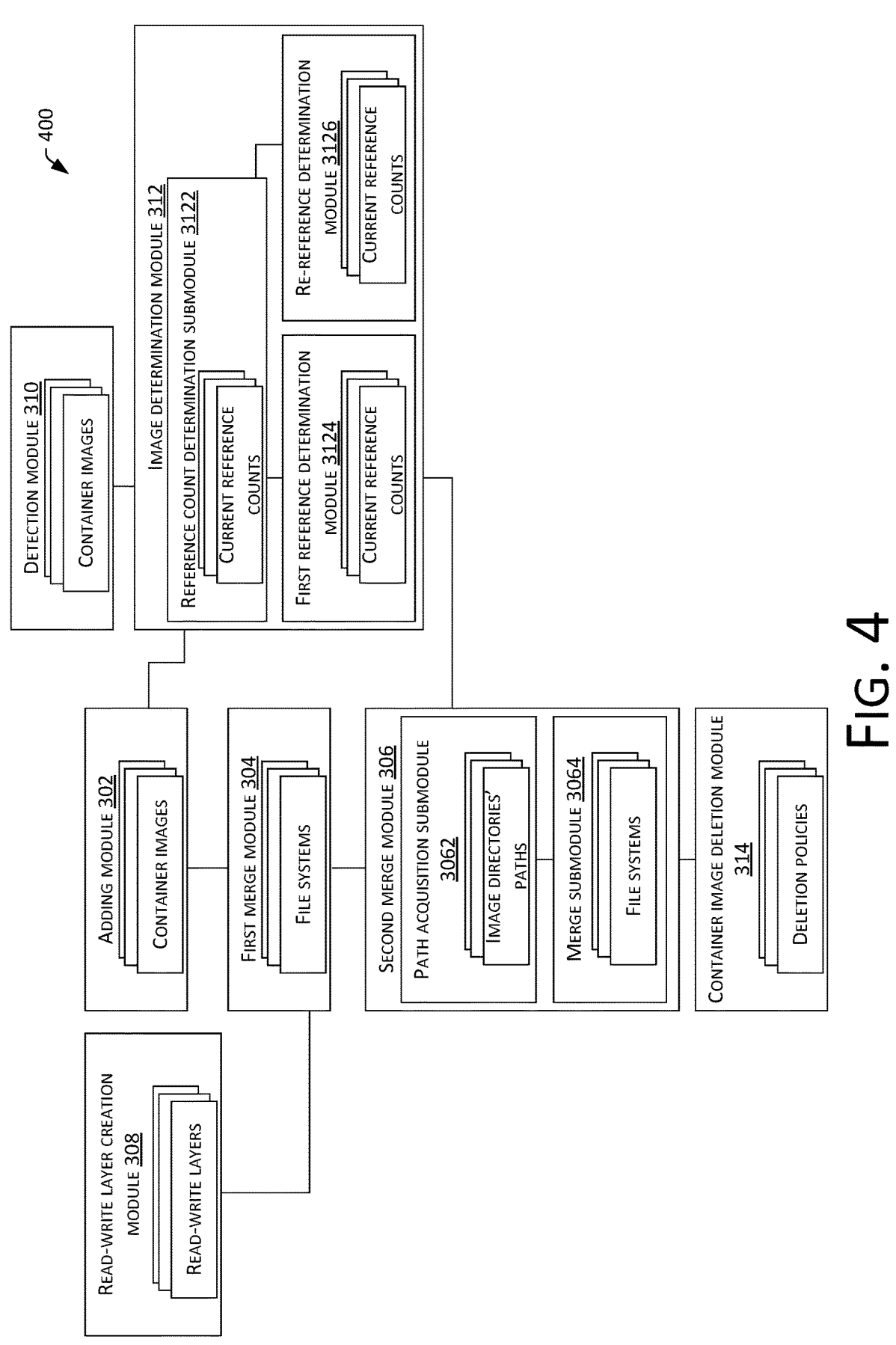
FIG. 4 is a schematic structural diagram of an apparatus for starting a secure container provided by another embodiment of the present disclosure.

FIG. 4 shows a schematic structural diagram of an apparatus 400 for starting a secure container provided by another embodiment of the present disclosure. As shown in FIG. 4, the apparatus 400 further includes: a read-write layer creation module 308, which can be configured to create a read-write layer from a directory of a storage medium in a virtual machine kernel of the secure container according to a unique identifier of the container when starting the container and assign thereof to the container.

In one or more embodiments of the present disclosure, considering maximally reusing resources, it is possible to detect a transfer of a container image to a secure container. For the same container image, only the first transfer detected is added, and subsequent transfers detected can be shared. Specifically, for example, the apparatus may further include: a detection module 310 and an image determination module 312.

The detection module 310 may be configured to detect a transfer of the container image to the secure container.

The image determination module 312 may be configured to determine whether the container image has been added to the secure container when detecting the transfer of the container image to the secure container.

The adding module 302 may be configured to add the container image to the secure container in the read-only manner if a determination of the image determination module 312 is negative.

The second merge module 306 may be configured to aggregate the read-write layer of the second container with the added container image in the secure container to obtain the file system of the second container if the determination of the image determination module 312 is positive.

In order to facilitate determine whether the container image has been added to the secure container, in one or more embodiments of the present disclosure, such determination is made based on the current number of references to the container image. Specifically, for example, as shown in FIG. 4, the image determination module 312 may include: a reference count determination submodule 3122, a first reference determination module 3124, and a re-referencing determination module 3126.

The reference count determination submodule 3122 may be configured to determine whether a current reference count corresponding to the container image is an initial value.

The first reference determination module 3124 may be configured to determine that the container image has not been added to the secure container if being the initial value.

The re-reference determination module 3126 may be configured to determine that the container image has been added to the secure container if being not the initial value.

The current reference count corresponding to the container image is updated correspondingly when the container image is used by any container or when a task of any container using the container image ends.

In one or more embodiments of the present disclosure, the adding module 302 may be configured to add a block device of the container image to the secure container in a read-only manner through a storage driver of a block device in a host machine. The storage driver of the block device in the host machine stores the container image in a form of a block device according to a block device type defined in a configuration file of the secure container.

In one or more embodiments of the present disclosure, the adding module 302 may be configured to receive a block device delivered by the storage driver of the block device in the host machine, mount the block device of the container image as an image directory in the secure container, and record a path of the image directory. The second merge module 306 may include: a path acquisition submodule 3062 and a merge submodule 3064.

The path acquisition submodule 3062 may be configured to obtain the path of the image directory of the block device.

The merge submodule 3064 may be configured to aggregate a path of the read-write layer of the second container and the path of the image directory of the block device in the secure container to obtain the path of the file system of the second container.

In one or more embodiments of the present disclosure, the apparatus may further include: a container image deletion module 314, which may be configured to determine whether to delete the container image from the secure container.

The foregoing is a schematic solution of apparatuses for starting a secure container in this embodiment. It needs to be noted that the technical solutions of the apparatuses for starting a secure container belongs to the same concept as the technical solutions of the methods for starting a secure container described above. For details not described in detail in the technical solutions of the apparatuses for starting a secure container, a reference can be made to the description of the technical solutions of the methods for starting a secure container.

Corresponding to the foregoing method embodiments, the present disclosure also provides a system architecture for starting a secure container. FIG. 5 shows a schematic structural diagram of a system 500 for starting a secure container provided by an embodiment of the present disclosure. As shown in FIG. 5, the system 500 includes: a secure container 504 and a storage drive 502.

The storage driver 502 may be configured to transfer a read-only container image to the secure container.

The secure container 504 may be configured to add the container image to the secure container in a read-only manner when starting a first container corresponding to the container image in the secure container; aggregate a read-write layer of the first container with the container image to obtain a file system of the first container; and aggregate a read-write layer of the second container with the added container image to obtain a file system of the second container when starting the second container corresponding to the container image in the secure container.

The foregoing is a schematic solution of a system for starting a secure container in this embodiment. It needs to be noted that the technical solutions of the system for starting a secure container belongs to the same concept as the technical solutions of the above-mentioned methods for initiating a secure container. For details not described in detail in the technical solutions of the system for starting a secure container, a reference can be made to the description of the technical solutions of the methods for starting a secure container.

Figure 6:
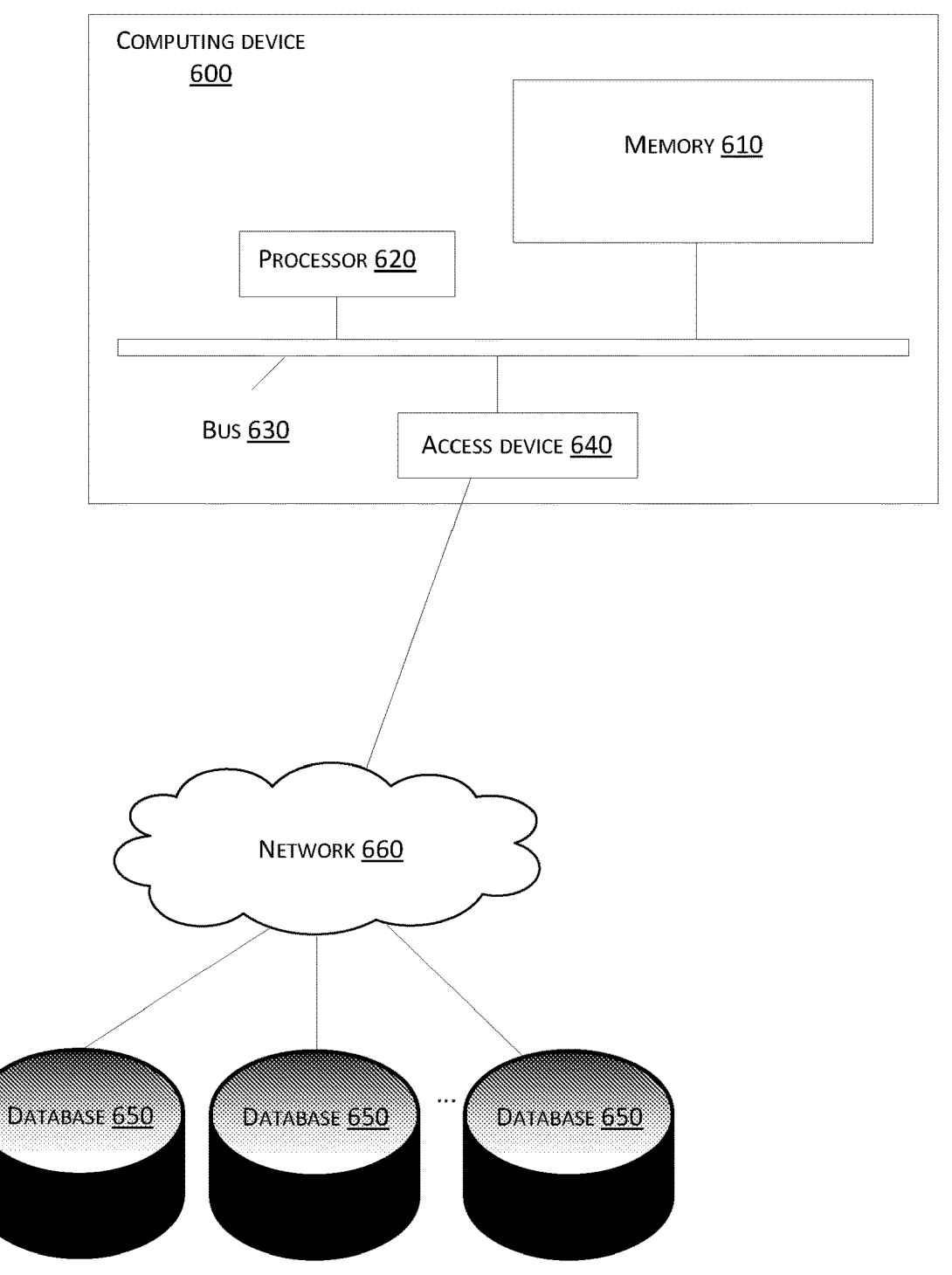
FIG. 6 is a structural block diagram of a computing device provided by the embodiments of the present disclosure.

FIG. 6 shows a structural block diagram of a computing device 600 provided according to the embodiments of the present disclosure. In implementations, the apparatuses described in FIGS. 3 and 4 may include one or more computing devices 600, or may be included in one or more computing devices 600. Components of the computing device 600 include, but are not limited to, a memory 610 and a processor 620. The processor 620 is connected to the memory 610 through a bus 630, and a database 650 is used for storing data.

In implementations, the memory 610 may include a form of computer readable media such as a volatile memory, a random access memory (RAM) and/or a non-volatile memory, for example, a read-only memory (ROM) or a flash RAM. The memory 610 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The computing device 600 also includes an access device 640 that enables the computing device 600 to conduct communications via one or more networks 660. Examples of these networks include a Public Switched Telephone Network (PSTN), a Local Area Network (LAN), a Wide Area Network (WAN), a Personal Area Network (PAN), or a combination of communication networks such as the Internet. The access device 640 may include one or more of any type of wired or wireless network interfaces (e.g., one or more of network interface cards (NIC)), such as an IEEE 802.11 wireless local area network (WLAN) wireless interface, a Worldwide Interoperability for Microwave Access (Wi-MAX) interface, an Ethernet interface, an Universal Serial Bus (USB) interface, a cellular network interface, a Bluetooth interface, a Near Field Communication (NFC) interface, etc.

In implementations, the above-mentioned components of the computing device 600 and other components not shown in FIG. 6 may also be connected to one another, for example, through a bus. It needs to be understood that the structural block diagram of the computing device shown in FIG. 6 is only used for the purpose of illustration, rather than limiting the scope of this description. One skilled in the art can add or replace other components as needed.

The computing device 600 can be any type of stationary or mobile computing device, including a mobile computer or mobile computing device (e.g., a tablet computer, a personal digital assistant, a laptop computer, a notebook computer, a netbook, etc.), a mobile phone (e.g., a smartphone), a wearable computing device (e.g., smart watches, smart glasses, etc.), or other types of mobile devices, or a stationary computing device such as a desktop computer or PC. The computing device 600 may also be a mobile or stationary server.

The processor 620 is configured to execute the following computer-executable instructions:

adding a container image into a secure container in a read-only manner when starting a first container corresponding to the container image in the secure container;

aggregating a read-write layer of the first container with the container image in the secure container to obtain a file system of the first container; and aggregating a read-write layer of a second container with the container image when starting the second container corresponding to the added container image in the secure container to obtain a file system of the second container.

The foregoing is a schematic solution of a computing device in this embodiment. It needs to be noted that the technical solutions of the computing device belongs to the same concept as the technical solutions of the above-mentioned methods for initiating a secure container. For details not described in detail in the technical solutions of the computing device, a reference can be made to the description of the technical solutions of the methods for starting a secure container.

The embodiments of the present disclosure also provide a computer-readable storage medium, which stores computer instructions, and the instructions, when executed by a processor, are used for:

adding a container image into a secure container in a read-only manner when starting a first container corresponding to the container image in the secure container;

aggregating a read-write layer of the first container with the container image in the secure container to obtain a file system of the first container; and aggregating a read-write layer of a second container with the container image when starting the second container corresponding to the added container image in the secure container to obtain a file system of the second container.

The foregoing is a schematic solution of a computer-readable storage medium in this embodiment. It needs to be noted that the technical solutions of the storage medium belongs to the same concept as the technical solutions of the above-mentioned methods for initiating a secure container.

For details not described in detail in the technical solutions of the storage medium, a reference can be made to the description of the technical solutions of the methods for starting a secure container.

The foregoing describes specific embodiments of the present disclosure. Other embodiments are within the scope of the appended claims. In some cases, actions or steps recited in the claims can be performed in an order different from that in the embodiments, and still achieve desirable results. In addition, processes depicted in the accompanying figures do not necessarily require a particular order or a sequential order as shown, to achieve desirable results. Multitasking and parallel processing are also possible or may be advantageous in certain embodiments.

The computer instructions include computer program codes, which may be in source code form, object code form, executable file or some intermediate form or the like. The computer readable medium may include: any entity or device capable of carrying computer program codes, a recording medium, a flash memory, a removable hard disk, a magnetic disk, an optical disk, a computer memory, a read-only memory (ROM), a random access memory (RAM), an electrical carrier signal, a telecommunication signal, and a software distribution medium, etc. It needs to be noted that the content included in the computer-readable medium may be appropriately increased or decreased according to the requirements of legislation and patent practice in associated jurisdiction. For example, in some jurisdictions, a computer-readable medium excludes electrical carrier signals and telecommunication signals.

It needs to be noted that, for the sake of simplicity of description, the above-mentioned method embodiments are expressed as a series of action combinations. However, one skilled in the art should know that the embodiments of the present disclosure are not limited by the described orders of actions. Since certain steps may be performed in other orders or in parallel according to the embodiments of the present disclosure. Moreover, one skilled in the art should also know that the embodiments described in the specification are all preferred embodiments, and actions and modules involved may not be necessarily required by the embodiments of the specification.

In the above-mentioned embodiments, the descriptions of each embodiment have their own emphases. For parts not described in detail in a certain embodiment, reference may be made to relevant descriptions of other embodiments.

The exemplary embodiments of the present disclosure disclosed above are only used for helping to explain the present disclosure. Alternative embodiments do not exhaustively describe all the details, and also do not limit the invention to the specific implementations that are described. Apparently, a number of modifications and changes can be made according to the contents of the embodiments of the present disclosure. The present disclosure selects and specifically describes these embodiments in order to better explain the principles and practical applications of the embodiments of the present disclosure, so that one skilled in the art can well understand and use the present disclosure. The present disclosure is to be limited only by the claims, and their full scopes and equivalents.

The invention claimed is:

1. A method implemented by a computing device, the method comprising:

adding a container image into a secure container in a read-only manner when starting a first container corresponding to the container image in the secure container;

aggregating a read-write layer of the first container with the container image in the secure container to obtain a file system of the first container; and aggregating a read-write layer of a second container with the container image when starting the second container corresponding to the added container image in the secure container to obtain a file system of the second container, wherein aggregating the read-write layer of the second container with the added container image in the secure container when starting the second container corresponding to the container image in the secure container to obtain the file system of the second container, comprises:

detecting a transfer of the container image to the secure container;

determining whether the container image has been added into the secure container when the transfer of the container image to the secure container is detected, wherein determining whether the container image has been added into the secure container comprises:

determining whether a current reference count corresponding to the container image is an initial value;

if the current reference count is the initial value, determining that the container image has not been added into the secure container; and if the current reference count is not the initial value, determining that the container image has been added to the secure container, wherein the current reference count corresponding to the container image is updated accordingly when the container image is used by any container and when a task of the any container that uses the container image is finished; and if determining that the container image has been added into the secure container, aggregating the read-write layer of the second container with the added container image in the secure container to obtain the file system of the second container.

2. The method according to claim 1, further comprising:
when starting a third container, in a virtual machine kernel of the secure container, creating a read-write layer directory from a directory of a storage medium according to a unique identifier of the third container and assigning thereof to the third container.

3. The method according to claim 1, wherein adding the container image into the secure container in the read-only manner comprises:

adding a block device of the container image into the secure container in the read-only manner through a storage driver of a block device on a host machine, the block device storing the container image, wherein the storage driver of the block device on the host machine stores the container image in a form of block device according to a block device type defined in a configuration file of the secure container.

4. The method according to claim 3, wherein adding the block device of the container image into the secure container in the read-only manner through the storage driver of the block device on the host machine comprises:

receiving a block device delivered by the storage driver on the host machine; and mounting the block device on an image directory in the secure container, and recording a path of an image directory of the block device, wherein aggregating the read-write layer of the second container with the added container image in the secure container comprises:
aggregating a path of the read-write layer of the second container with the path of the image directory of the block device in the secure container to obtain a path of the file system of the second container.

5. The method according to claim 1, further comprising:
determining whether to delete the container image from the secure container according to a preset deletion policy after tasks of all containers corresponding to the container image are finished.

6. One or more non-transitory computer readable media storing executable instructions that, when executed by one or more processors, cause the one or more processors to perform acts comprising:

adding a container image into a secure container in a read-only manner when starting a first container corresponding to the container image in the secure container;

aggregating a read-write layer of the first container with the container image in the secure container to obtain a file system of the first container; and aggregating a read-write layer of a second container with the container image when starting the second container corresponding to the added container image in the secure container to obtain a file system of the second container, wherein aggregating the read-write layer of the second container with the added container image in the secure container when starting the second container corresponding to the container image in the secure container to obtain the file system of the second container, comprises:

detecting a transfer of the container image to the secure container;

determining whether the container image has been added into the secure container when the transfer of the container image to the secure container is detected, wherein determining whether the container image has been added into the secure container comprises:

determining whether a current reference count corresponding to the container image is an initial value;

if the current reference count is the initial value, determining that the container image has not been added into the secure container; and if the current reference count is not the initial value, determining that the container image has been added to the secure container, wherein the current reference count corresponding to the container image is updated accordingly when the container image is used by any container and when a task of the any container that uses the container image is finished; and if determining that the container image has been added into the secure container, aggregating the read-write layer of the second container with the added container image in the secure container to obtain the file system of the second container.

7. The one or more non-transitory computer readable media according to claim 6, the acts further comprising:
when starting a third container, in a virtual machine kernel of the secure container, creating a read-write layer directory from a directory of a storage medium according to a unique identifier of the third container and assigning thereof to the third container.

8. The one or more non-transitory computer readable media according to claim 6, wherein adding the container image into the secure container in the read- only manner comprises:

adding a block device of the container image into the secure container in the read-only manner through a storage driver of a block device on a host machine, the block device storing the container image, wherein the storage driver of the block device on the host machine stores the container image in a form of block device according to a block device type defined in a configuration file of the secure container.

9. The one or more non-transitory computer readable media according to claim 8, wherein adding the block device of the container image into the secure container in the read-only manner through the storage driver of the block device on the host machine comprises:

receiving a block device delivered by the storage driver on the host machine; and mounting the block device on an image directory in the secure container, and recording a path of an image directory of the block device, wherein aggregating the read-write layer of the second container with the added container image in the secure container comprises: aggregating a path of the read-write layer of the second container with the path of the image directory of the block device in the secure container to obtain a path of the file system of the second container.

10. The one or more non-transitory computer readable media according to claim 6, the acts further comprising:

determining whether to delete the container image from the secure container according to a preset deletion policy after tasks of all containers corresponding to the container image are finished.

11. An apparatus comprising:

one or more processors;

memory;

an adding module stored in the memory and executable by the one or more processors to add a container image into a secure container in a read-only manner when starting a first container corresponding to the container image in the secure container;

a detection module stored in the memory and executable by the one or more processors to detect a transfer of the container image to the secure container;

an image determination module stored in the memory and executable by the one or more processors to determine whether the container image has been added to the secure container when detecting the transfer of the container image to the secure container, wherein the image determination module comprises:

a reference count determination submodule configured to determine whether a current reference count corresponding to the container image is an initial value;

a first reference determination module configured to determine that the container image has not been added to the secure container if the current reference count is the initial value; and a re-reference determination module configured to determine that the container image has been added to the secure container if the current reference count is not the initial value;

a first merge module stored in the memory and executable by the one or more processors to aggregate a read-write layer of the first container with the container image in the secure container to obtain a file system of the first container; and a second merge module stored in the memory and executable by the one or more processors to aggregate a read-write layer of a second container with the container image when starting the second container corresponding to the added container image in the secure container to obtain a file system of the second container.

12. The apparatus according to claim 11, wherein: the adding module is configured to add the container image to the secure container in the read-only manner if the image determination module determines that the container image has not been added to the secure container; and the second merge module is configured to aggregate the read-write layer of the second container with the added container image in the secure container to obtain the file system of the second container if the image determination module determines that the container image has not been added to the secure container.

* * * * *